Sept. 14, 1965     T. F. PAULS ETAL     3,205,563
FINNED STRUCTURE AND METHOD OF MANUFACTURE
Filed June 21, 1956                     5 Sheets—Sheet 1

INVENTORS:
THERON F. PAULS
RICHARD F. ADAMS

By John D. Wilkins & Leonard B. Hoff
ATTORNEYS.

Sept. 14, 1965  T. F. PAULS ETAL  3,205,563
FINNED STRUCTURE AND METHOD OF MANUFACTURE
Filed June 21, 1956  5 Sheets-Sheet 2

INVENTORS:
THERON F. PAULS
RICHARD F. ADAMS

By John D. Wilkins & Lionel S. Hoff
ATTORNEYS.

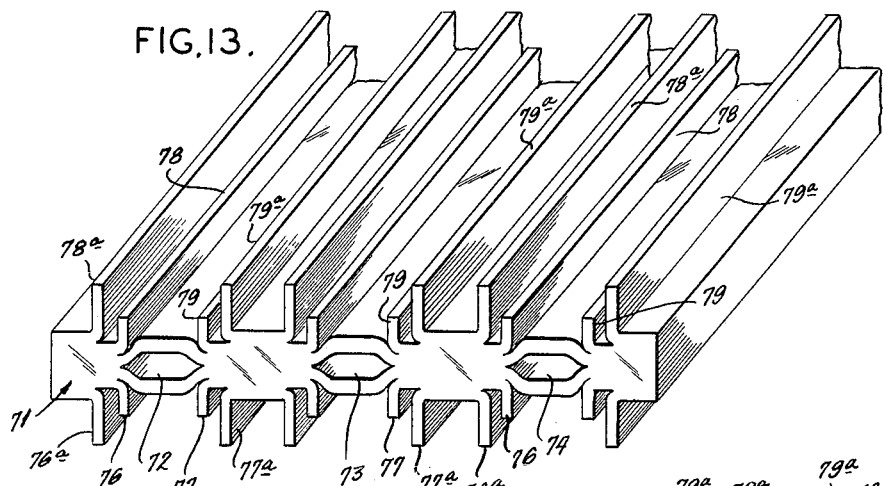
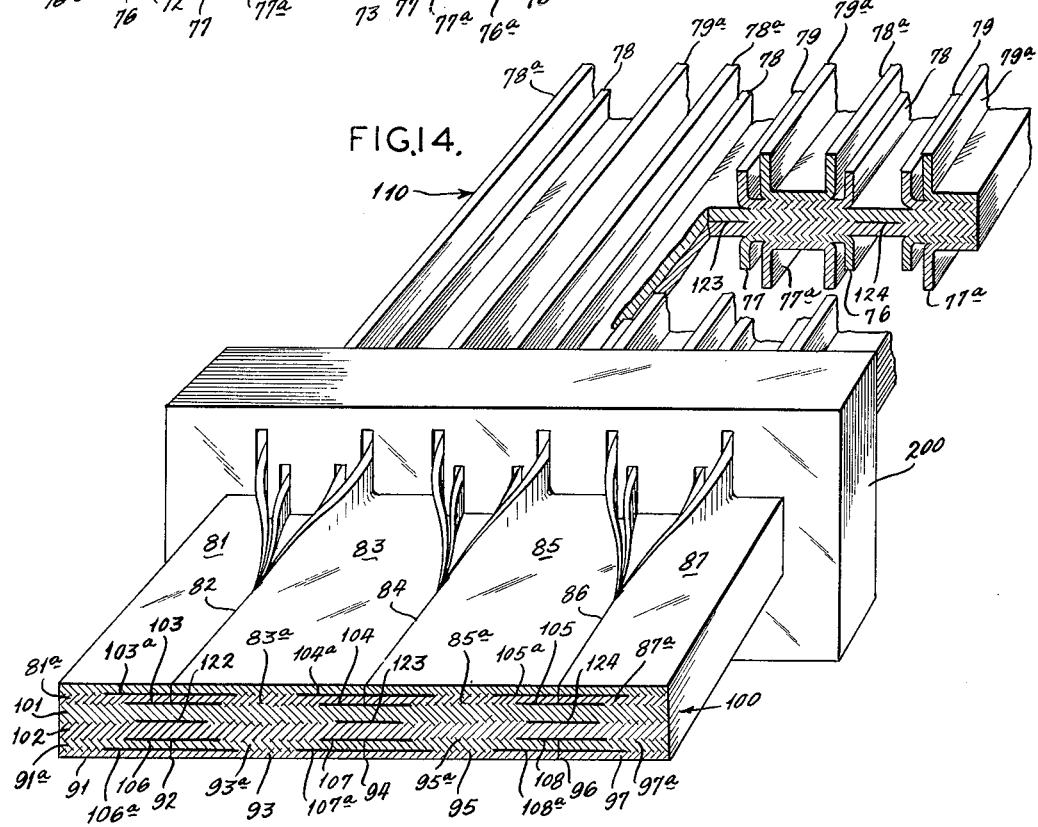

INVENTORS:
THERON F. PAULS
RICHARD F. ADAMS

United States Patent Office 3,205,563
Patented Sept. 14, 1965

3,205,563
FINNED STRUCTURE AND METHOD OF
MANUFACTURE
Theron F. Pauls, Godfrey, Ill., and Richard F. Adams, Goshen, Ind., assignors to Olin Mathieson Chemical Corporation, East Alton, Ill., a corporation of Illinois
Filed June 21, 1956, Ser. No. 592,785
7 Claims. (Cl. 29—157.3)

This invention relates to a new and improved finned or reinforced panel or sheet structure and to its method of manufacture.

In the fabrication of various articles of manufacture such as construction panels including those of sheet metal, for example, and particularly in the manufacture of heat exchangers such as radiators and like, it is frequently necessary to provide ribs or fins either for the purpose of improving the strength of such articles or, as in heat exchangers, for the purpose of facilitating the transmission of heat, or for both purposes. Although flanges and fins are desired in articles of this general type, the assembly of fins or reinforcing flanges poses a difficult manufacturing problem. For example, the assembly of fin stock with the hollow fluid conducting members of a heat exchanger device is a difficult and expensive operation. In the manufacture of heat exchangers especially, assembly of flat or plate type tubes or panels with a stack of superposed perforated fin sheets or with corrugated fin stock is a relatively slow operation. Such assembly is further complicated by the need for making good contact between the tube and the fins for proper heat conduction as well as for securely assemblying the parts.

Therefore, one of the objects of this invention is the provision of a new and improved relatively thin and economical panel structure having integral flanges or fins suitable for various purposes such as strengthening or fastening or heat exchange. Another object is the provision of a new and improved heat exchange tube structure with integral fins. Another object is the provision of a structural panel having both internal passageway or corrugations together with external ribs and/or connecting flanges. Still another object is the provision of a new and improved method of forming such structures characterized by economy and freedom from poorly secured parts such as are responsible for easily broken or poorly conductive joints. Other objects and advantages will become apparent from the following description of various embodiments of the invention when taken together with the accompanying drawings in which:

FIG. 13 is a perspective view of part of a finned hollow panel according to another embodiment;

FIG. 14 is a perspective view of the first intermediate product or blank from which the embodiment of FIG. 13 is made, a suitable bending die and the resultant second intermediate product with a portion broken away;

Figure 1:
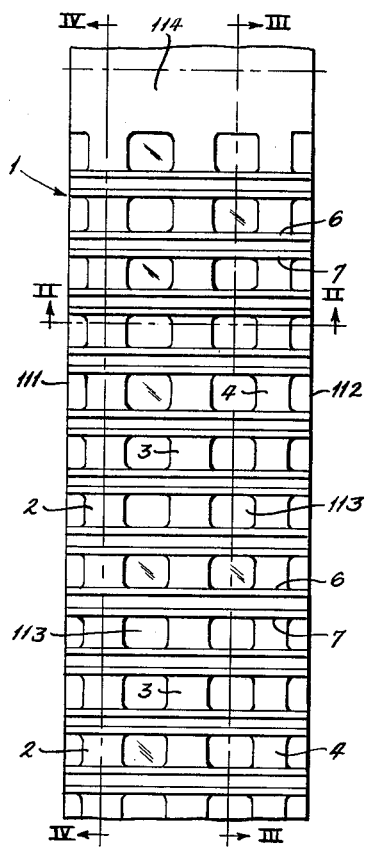
FIG. 1 is an elevational view of one side of a finned tube panel illustrating an embodiment of this invention.

In accordance with this invention there is made a panel or sheet having many integral and closely spaced, short appendages each superadded to a basic starting sheet and protruding at a rather sharp right angle from at least one side in cooperating association with each other and/or with distentions or corrugations in the basic sheet. By sharp is meant a 90° bend on a radius of not more and preferably less than the order of the thickness of the sheets bent. The sharper the bend, the better the heat exchange and stiffness. By short is means an empirically determinable protrusion not in excess of that beyond which neither heat exchange not stiffening is efficient. Short protrusion also allows closer spacing and more appendages per unit area. These appendages take the form of flanges, ribs or fins preferably thinner than the base sheet of the panel and extend either longitudinally or transversely with respect to the panel. These appendages are formed from one or more outer component layers on either one or both sides of the basic starting sheet. The appendages may protrude only from one side for certain purposes while for others they extend preferably from both surfaces. Those on opposite surfaces extend either transversely or in overlapping relationship with each other or with the distended portions. In any event the optimum arrangement is achieved when an array of appendages is associated with another such arrangement or hollow corrugated portions. In the latter arrangement the ribbed or finned panel has distended passageways which may advantageously carry other structures or substances such as heat exchanger fluid. Preferably the distended passageway portions carry the appendages. Thus the invention contemplates an integrally finned and interfacially cavitated panel.

Such a panel is made by providing a partially laminated but otherwise solid blank integrated from starting sheets including a divisible outer layer by pressure welding leaving, however, strata at which the blank is not integrated and then peeling back an outer component layer at an edge portion formed opposite a laminated area of the panel. More specifically each of the edge portions at which division of the surface component layer occurs and at which fin or rib erection is to commence is provided either by the contiguous edges of separate strips laid side by side to make up an outer or surface layer over an adjacent inner layer or by a severance made at sometime in the outer layer. The severance may be made immediately prior to and as part of the peeling back step and in this instance fabrication includes the intermediate step of slitting an outer layer at the laminations on one or the other or on both sides of the surface of the panel opposite the stop-weld layer preliminary to the formation of the outwardly bent ribs or fins.

According to one aspect of the invention, two or more strata of interfacial parting substantially parallel to the outer faces are employed and at least one stratum of interfacial separation is subjected to internal pressure so as to form fluid conduits in the panel by distention while leaving the other stratum or the outer strata in the laminated areas for peeling to erect the external fins. Thus with two strata of interfacial parting, one may be subject to distension while the other is peeled. In a three strata arrangement the inner stratum is distended while both the outer are peeled. Prior to peeling, a hollow panel may be subjected to distension to facilitate peeling in the outer layers.

The various component sheet metal layers of the panel are unified in certain areas while maintained separate to form laminated areas by pressure unification accompanied by selective weld prevention in accordance with the principles set forth in U.S. Patent No. 2,690,002 issued to L. H. Grenell. In fabrication at least two component sheets of base material, such as metal, are first laid up together with suitable intervening patterns of any suitable stop-weld or weld preventing material such as one including colloidal graphite or the like. This assembly is then pressure unified, except at the interfacial internal portion occupied by stop-weld, by a suitable metal working step such as rolling in which the thickness of the assembly is reduced as it undergoes elongation. Generally, the pattern consists of an array of spaced parallel stripes or bands of weld preventing material applied in a suitably thin layer.

At least one of the outer or surface component layers or sheets of the base material is initially subdivided or subjected to a division in a direction normal to the thickness of the layer and then subjected to outward bending so as to erect the fins or ribs. Division is done in the areas overlying or underlying the separation material. For example, with respect to longitudinally extending stripes of such separation material, a surface layer of base material is divided longitudinally along the midplane. This may be done by severing the layer after pressure unification or by forming the component outer layer of a number of contiguous strips laid side by side in superposition with the adjoining component layer. When separate strips are initially employed it has been found advantageous to accomplish the pressure unification by rolling in the direction of the strips rather than across them. With suitable equipment it is possible to accomplish the necessary severance and bending in one operation.

When internal cavities are desired, another predetermined pattern of separation material is applied in a stratum adjoining or intervening the aforementioned stripes or bands of separation material. The pressure unified blank with such additional pattern is then subjected to fluid pressure internally along the appropriate pattern in a suitable manner so as to permit erection of the desired passageway structure by distension of portions of the sheet metal structure.

When the panel is cavitated each individual fin preferably is unified with an evenly distended cavitated portion, but any one individual fin may be integrated either along a distended tube portion or along a solid portion next to a tube just so long as the fin is associated in parallel with a corrugated tube portion. Where a fin is to extend across tube passages the intervening space on the sheet preferably is also cavitated until distended to substantially the same degree as the adjacent tube section so as to form a substantially even surface portion on which the fin is integrated with the panel and from which the individual fins then may project, each remaining undistorted.

In accordance with one preferred embodiment of this invention, there is provided a plate type of heat exchanger tube having primary heat exchanger fluid passageways extending throughout the length of the panel and having external fins pressure unified with the walls of said fluid passageway portions of the panel. Such a panel is characterized by relatively complete freedom from joints containing extraneous brazing or soldering material. The external fin structure may be of either pair or single type, it being essential only that a secondary heat exchanger fluid be admissable to the external surface of the tube walls and the surfaces of the fins in intimate heat exchange relationship. The fins may be disposed in any direction with respect to the primary or internal heat exchanger fluid passageway, but for certain heat exchange applications it is preferred that the fins be disposed in a direction transverse with respect to the axis or direction of the internal passageways. The internal passageways may consist of a single relatively wide flat passageway or a row of spaced parallel passageways. When the internal passageway consists of a number of separate passageways it is preferred that at intervals these be interconnected by transversely extending passageways. Furthermore, it is preferred that the fin structure be pressure unified only to the evenly distended wall portions of the internal passageways. The fin structure may be provided in some instances to only one side of the heat exchanger panel structure while in other instances it is advantageous that the fin structure extend from both sides of the panel.

In the preferred embodiment of FIGS. 1–4 the panel 1 is characterized by an inner or central tube portion.

Figure 3:
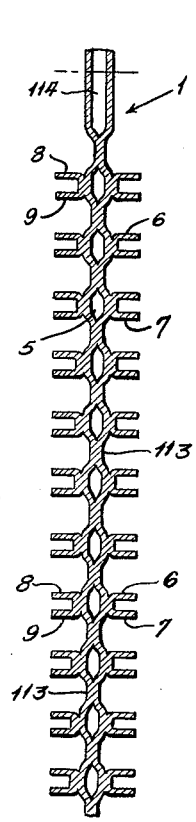
FIG. 3 is a longitudinal cross sectional view taken on line III—III of FIG. 1.
Figure 2:
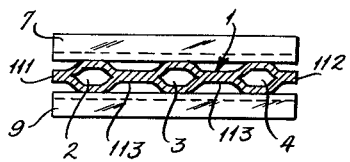
FIG. 2 is a transverse sectional view taken on line II—II of FIG. 1.

There are fluid passageways such as 2, 3, and 4 extending longitudinally of the panel and a series of fins such as the pairs 6 and 7 and the pairs 8 and 9 which extend across the panel and protrude from opposite sides of the tube portion. These fins are joined to only the distended portions of the panel although they cross the passageways 2, 3, and 4. For example, the pairs of fins 6 and 7 extend from the distended portion which includes an interconnecting passageway 5 between the main passageways 2, 3 and 4. The pair of fins 8 and 8 on the opposite side of the panel likewise extend outwardly in association with transverse passageways 5 which form interconnections at longitudinally spaced intervals. It is to be noted that the degree of distension of the transverse passageways 5 is substantially equal to that of the degree of distension of the longitudinally distending passageway 2, 3 and 4 (FIGS. 2 and 3). In other areas such as the lateral edge portions 111 and 112 and in the isolated portions 113 the panel 1 is pressure unified and, therefore, undistended. At each extremity of panel 1 there is provided a distended portion 114 common to all of the main passageways 2, 3, and 4 so as to adapt the panel for connection with any suitable structure such as a header or the like.

Figure 4:
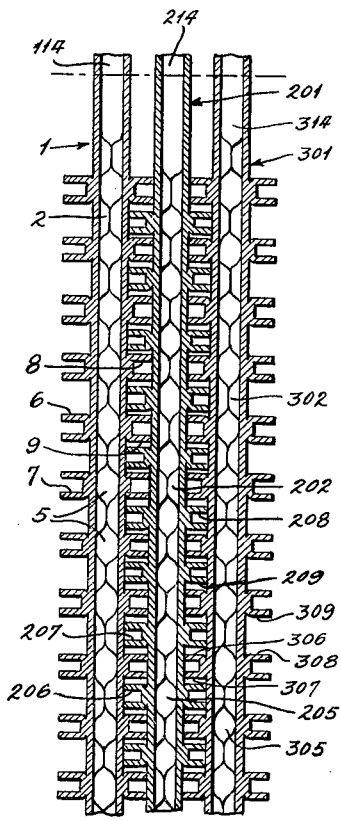
FIG. 4 is a longitudinal cross sectional view taken on line IV—IV of the panel of FIG. 1 shown assembled, however, with a number of similar panels adjacent ones of which are in desired vertical offset relationship so as to form a heat exchanger core, such as an automobile radiator core, with relatively closely spaced fins.

Panels of this type are adaptable to the formation of a heat exchanger radiator core of the type shown in FIG. 4, for example. Here panel 1 is shown laid up with similar panels 201 and 301. Alternate panels are alike in all respects and differ from intervening panels only in the end connection. Thus end connection 114 of panel 1 is identical with end connection 314 of panel 301. The end connections of these two panels in turn differ from the end connection 214 of the adjacent panel 201 only in length so as to offset the entire series of fins of one panel from those of the series of fins of the adjacent panel. In this manner, pairs of fins 8 and 9 of panel 1 are set in the intervening spaces between pairs of fins 206 and 207 of panel 214. In the same way the pairs of fins 208 and 209 on the opposite side of the panel 201 are interfitted between pairs of fins 306 and 307 of panel 301. This provides desirably close spacing and a great multiplicty of fins between corresponding adjoining fluid passageways such as passageways 2, 202 and 302 of panels 1, 201 and 301, respectively. At the ends of the resultant core, connection is made with any suitable header structure.

Figure 5:
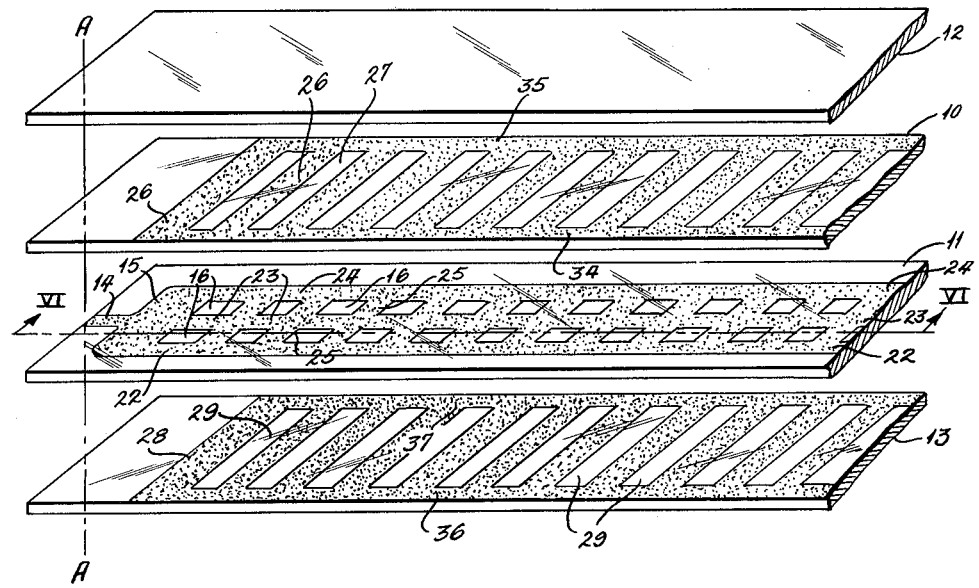
FIG. 5 is a perspective exploded view of component sheets or panels with suitable interposed patterns of weld preventing material all prior to assembly to form the structure of the finned tube sheet shown in the previous figures.
Figure 6:
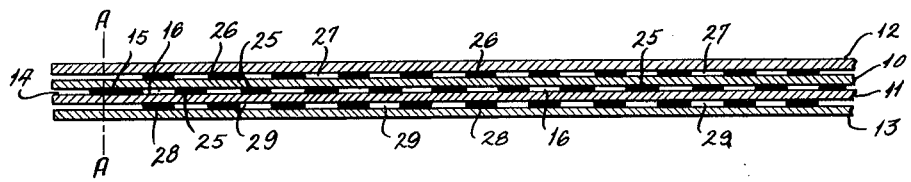
FIG. 6 is a cross sectional view taken on plane VI—VI of FIG. 5 with the component sheets put into superposition and ready to be pressure unified.
Figure 7:
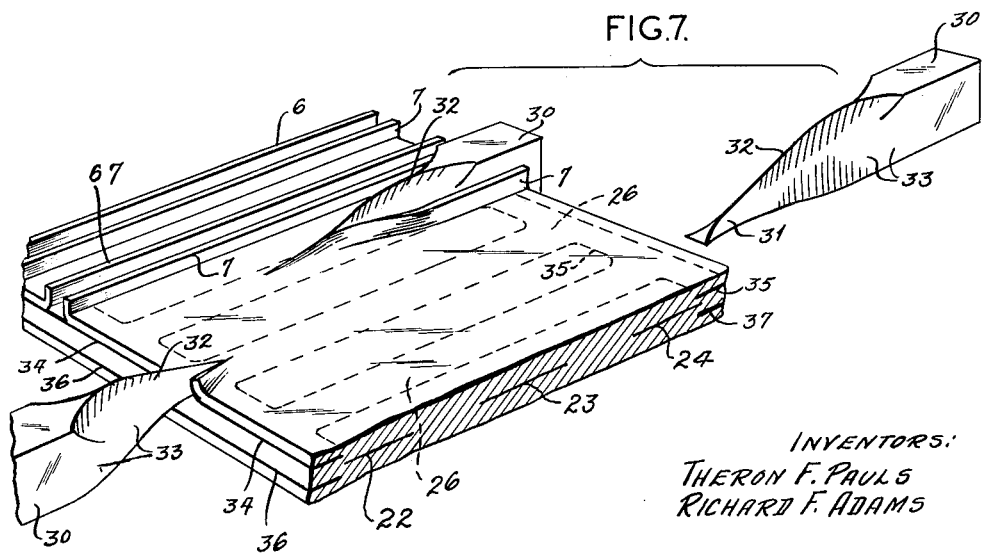
FIG. 7 is a fragmentary perspective view showing the manner of forming fins from the intermediate product produced by unification of the assembly shown in FIG. 6.

The manufacturing of the panel of the foregoing embodiment is shown in FIGS. 5, 6, and 7. Inasmuch as the panel is made up of the four plies of basic material such as any suitable sheet metal, four component sheets 10, 11, 12 and 13, after appropriate preliminary preparation, are laid up in super-position in the relationship shown in FIGS. 5 and 6 for pressure unification. However, before the sheets are put into super-position one of the inner components layers, namely 11, has applied to one side of it a pattern of weld preventing or separation material in a thin layer which forms the primary or inner pattern of the resultant assembly. To adapt it for inflation, this inner pattern includes an inlet extension 14 which extends sufficiently to intersect with an outside edge as shown. The other end of extension 14 continues into a relatively large area of separation 15 adapted for forming a common connection and also forming the header connection portion 114 after inflation and cutting along line A—A to expose the connecting portion. From area 15 there extends longitudinally stripes 22, 23 and 24 of separation material spaced transversely from each other. At longitudinally spaced intervals there extend transverse bands 25 intersecting with each of the longitudinal stripes 22, 23 and 24. There then remains between these longitudinally and transversely extending stripes and bands of material isolated areas 16 free from separation material and adapted therefore for contact and pressure unification with the opposite face of the adjoining component sheet 10. Thus, when the inner sheets 10 and 11 are juxtaposed in superposition while there remains sandwiched between them the pattern of separation material, these are ready for pressure welding by rolling. Before the outer component sheets 12 and 13 are laid up with the inner sheets, two other identical patterns of separation material, which may be referred to as secondary patterns, must be applied in transversely extending longitudinally spaced bands so as to obtain a desired partial pressure unification between the pair of component sheets 10 and 12 and likewise desired partial pressure unification between the pair of component sheets 11 and 13. Thus, on the surface of sheet 10 facing sheet 12 there is applied bands of separation material 26 leaving between them areas 27 free from separtion material. Similarly, to the surface of sheet 13 facing sheet 11 there is applied bands of separation material 28 leaving between them areas 29 free from separation material. The relationship between the three resultant layers of separation material is such that the weld preventing bands 26 overlie the transverse array of isolated areas 16 free from weld preventing material, while the bands 28 underlie the same transverse array of isolated areas 16. It will also be noted that while the inner pattern of separation material does not extend to the lateral edges of component sheet 11 or the adjoining sheet 10, the pattern made up of bands 26 and the pattern made up of the bands 28 each extend to the lateral or longitudinally extending edges of the component sheets between which these latter patterns are disposed. It is to be further noted that at these lateral edges, all the bands 26, for example, are interconnected with longitudinally extending bands of separation material 35 and 34 while all the bands 28 are interconnected at the lateral edges by longitudinally extending bands of separation material 36 and 37. As a consequence the secondary pattern is ladder-shaped.

When the four component sheets are laid up in superposition ready for passage through a reducing instrumentality for pressure unification they are as shown in FIG. 6.

After pressure unification and prior to inflation, the series of fins may be erected by means of any suitable apparatus such as the apparatus shown in FIG. 7. Along each of the outer transversely extending bands of separation material, namely 26 and 28, there are inserted piercing, cutting and bending tools 30 preferably from alternate sides of the pressure unified strip. First, the piercing edge 31 of each tool is driven into the linear indication of the bands such as 34 and 36 visible at the lateral edges of the resultant sheet. Then as each of the tools 30 progresses inwardly, the cutting edge 32 accomplishes a severance in the outer layer along the midplane of the area overying separation bands 26, for example. As the tool 30 is driven in further, the bending profile 33 turns the edges of the outer layer adjoining the severance to extend outwardly from the sides of the sheet to form fins 6 and 7. It will be understood that in similar manner pairs of fins 8 and 9 are erected. The finned sheet is then inflated by applying an inflation fluid at the extension 14 which distends the inner pattern along the terminal portions 15 the longitudinally extending bands 22, 23 and 24 and along the transversely extending bands 25 to produce the hollow finned panel 1 of FIGURE 1.

Alternately in making the product, fluid pressure may be used both before as well as after the fin slitting operation. To do this, it is necessary to apply the patterns shown in FIG. 5, to somewhat wider component sheets. With these, edge bands 34 and 35 as well as edge bands 36 and 37 of the secondary patterns are spaced from the lateral edges of the component sheets although not as much as stripes 22 and 24 of the primary pattern. With a suitable inlet connection, relatively moderate fluid pressure can be applied along the secondary patterns to more greatly separate sheets 12 and 13 from sheets 10 and 11 respectively. This has the advantage of facilitating the slitting operation which follows as explained hereinbefore after the lateral edges of the assembly are trimmed off to expose separation bands 34, 35, 36 and 37 and bare the ends of the bands 26 and 28.

Figure 8:
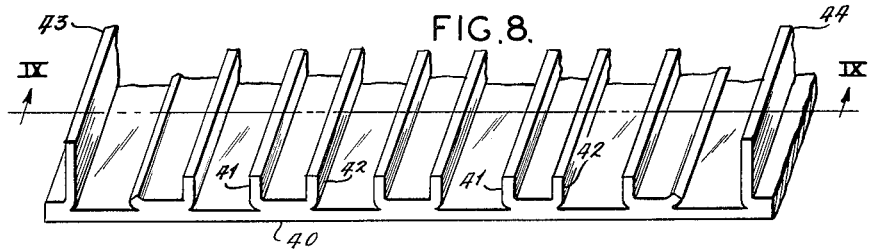
FIG. 8 is a partial perspective view showing a panel according to another embodiment.

In the embodiment of FIG. 8 there is shown a structural panel, one component sheet 40 of which is left as a flat base while the other provides a multiplicity of relatively closely spaced but not greatly upstanding ribs such as 41 and 42. The panel may also advantageously be provided with more greatly extending ribs such as 43 or 44 either adjacent the ends as shown or at intervals between the series of ribs 41 and 42. While ribs 41 and 42 serve primarily to stiffen the panel, 43 and 44 are flanges adapted to serve for the additional purpose of suspending, supporting, or otherwise making connection with studs, uprights, sills or beams.

Figure 9:
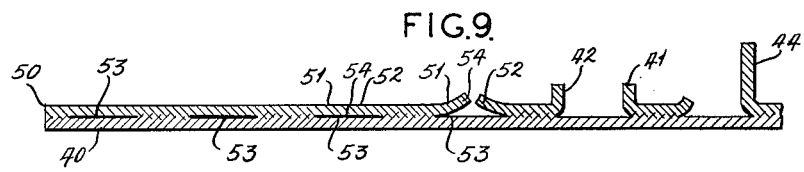
FIG. 9 is a cross sectional view of the blank used for making this embodiment taken on plane IX—IX showing stages prior to, during and after rib erection.

In the manufacture of the panel of FIG. 8 there is employed a blank of the type shown in FIG. 9. It consists of component sheets 40 and 50 which are unified at spaced elongated intervals except at spaced elongated areas of separation 53 occupied by a thin layer of suitable weld preventing material. In manufacture of the finished panel from this blank, the first step is to make a severance 54 in the sheet 50 in the portion overlying the stop-weld layer 53. The resulting portions or halves 51 and 52 overlying unwelded area 53 are sharply bent upwardly in any suitable manner to form the ribs 41 and 42 or the ribs 43 and 44 all of which make a fairly sharp angle of substantially 90° with the base of the ribbed panel. The more greatly protruding ribs 43 and 44 are formed by making the severance 54 at one side or the other adjacent a lateral extremity of weld preventive layer 53 so that substantially all of the overlying portion of sheet 50 at such place can be bent away from sheet 40 to form a more extensively projecting flange such as 43 or 44. If desired, the portion of layer 53 associated with either flange 43 or 44 may be wider than usual to provide even greater rib protrusion.

While erection of ribs in pairs has been described in the foregoing it will be understood that with suitable modification only single ribs instead of pairs of ribs may be erected at spaced intervals. The many closely spaced ribs or fins, however erected, must project squarely to impart maximum panel stiffness and/or efficient heat exchange.

Figure 10:
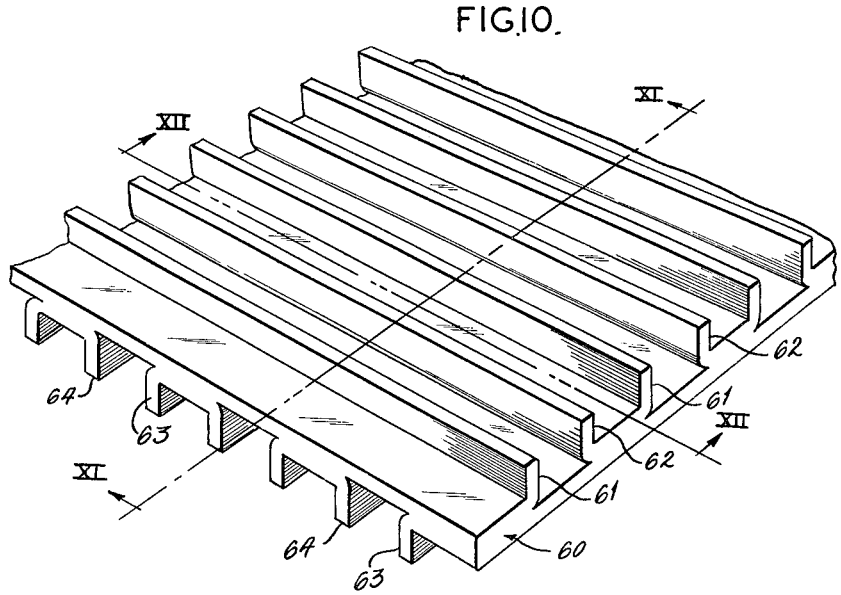
FIG. 10 is a partial perspective view of a panel according to another embodiment.

The embodiment shown in FIG. 10 is characterized by ribs on both of the surfaces of the panel 60. From the top surface there extend a multiplicity of spaced parallel ribs such as 61 and 62; from the bottom surface there extend a multiplicity of ribs such as 63 and 64. The series of ribs 63 and 64, however, is disposed in a direction crosswise the series consisting of ribs 61 and 62. This provides the maximum rigidity in panel 60 and leaves no flat face which for certain purposes is of no disadvantage.

Figure 11:
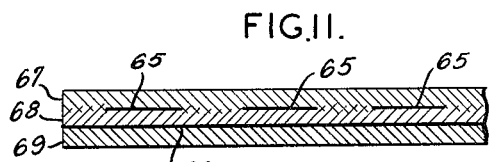
FIG. 11 is a cross sectional view of the blank used for making the embodiment of FIG. 10 shown taken on plane XI—XI prior to erection of the ribs.
Figure 12:
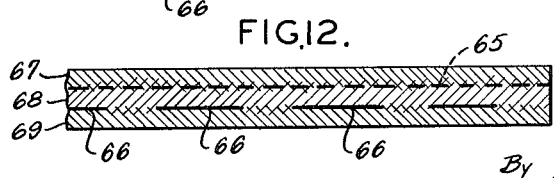
FIG. 12 is a cross sectional view of the blank of FIG. 11 taken on plane XII—XII prior to erection of the ribs.

Manufacture of the panel of FIG. 10 is quite similar to that of the panel of FIG. 8 with the difference, however, being that the blank employed (FIGS. 11 and 12) has three component layers, namely 67, 68, and 69, rather than two layers. The blank used for this embodiment has one set of parallel spaced stripes of stop-weld material 65 between the basic component pair of sheets 67 and 68 and also a second set of parallel spaced stripes of stop-weld material 66 between the basic component pair of sheets 68 and 69. A series of severances is made in outer component sheets 67 and 69 along the lengths of the stop-weld layers 65 and 66, respectively. Finally, the various ribs are bent up to protrude outwardly to provide the ribbed panel 60 of FIG. 10. It is to be understood that where somewhat less stiffening is needed, the ribs 63 and 64 may extend in parallel with the ribs 61 and 62 but in such a manner that the elongated weld preventing layers 65 extend in parallel in staggered relationship to the layers 66.

In the embodiment of FIG. 13, the hollow finned panel 71 has passageways 72, 73 and 74 extending down the length of the panel and also a series of both primary and secondary ribs extending down the length of the panel in parallel with the passageways. On the upper surface of the panel in the space between the passageways and adjacent the longitudinal edges are pairs of the primary fins 78 and 79 extending directly from the upper surface of the panel 71. There are also pairs of secondary fins 78a and 79a which like fins 78 and 79 are integral with the panel 71 but which are integrated directly with the primary fin base instead of directly with the basic sheet of the panel. In like manner, from the lower surface there extend the primary fins 76 and 77 and also the secondary fins 76a and 77a. It is to be noted that the fins in this embodiment extend in the same direction as the passageways of the cavitated panel and are disposed in the space portion, which is to say in the undistended portion of the panel between the passageways, whereas in the embodiment of FIGS. 1–4 the fins extend from the distended portions of the panel and run transversely with respect to the main passageway of the panel. It is to be further noted that there are proportionately more fins and that fins are of thinner gauge than the tube walls. This provides more radiating surface per pound of panel material employed.

The embodiment of FIG. 13 is manufactured using the blank 100, the typical apparatus 200 and the process illustrated in FIG. 14.

The blank, shown after pressure unification, has six component layers of a suitable material such as metal separated at appropriate places by means of thin layers of stop-weld material. The outer component layers in this embodiment are each in several parts laid up side by side on inner sheets 101 and 102. Each part is longitudinally extending strip already separated from adjoining strips of the surface layer. Thus, the upper outer component layer consists of strips 81, 83, 85 and 87. The lower outer component consists of strips 91, 93, 95 and 97. Although for some purposes solid strips are adequate, in this embodiment the strips making up the outer layers are duplex strips. Thus, associated with the outer layer 81 is an adjoining layer 81a pressure unified therewith except in the area 103a occupied by the weld preventing material extending to the line of separation 82 found between the duplex strip made up of 81 and 81a and the duplex strip made up of 83 and 83a. The area of separation 103 extends across the line 82 to provide a partial separation of duplex components 83 and 83a. In similar fashion, each of the outer strips 83, 85, 87, 91, 93, 95 and 97 has associated with it an adjoining strip 83a, 85a, 87a, 91a, 93a, 95a and 97a to make up duplex strips each partially pressure unified in one area and separated in other areas. Those strips making up the upper layers are parted in the areas 103a, 104a and 105a, while those making up the lower layers are parted at the areas 106a, 107a and 108a. The outer duplex strips are all pressure unified with an inner pair of component sheets 101 and 102 except in longitudinally extending areas occupied by separation material in a thin layer. Thus the upper set of duplex strips are unified with the inner component sheet 101 except at separation areas 103, 104 and 105 which underlie the aforementioned separation areas 103a, 104a and 105a respectively. Similarly the lower set of duplex strips are unified with sheet 102 except at separation areas 106, 107 and 108 overlying the aforementioned areas 106a, 107a and 108a. The inner component sheets 101 and 102 likewise are pressure unified except at the spaced areas of separation 122, 123 and 124. In this embodiment only the inner sheets 101 and 102 are coextensive with the panel to be formed inasmuch as lines of subdivision or severance 82, 84, 86, 92, 94 and 96 are initially provided in the outer layers from which the fins are to be formed. Each line of subdivision intersects with the two outermost layers or strata of separation material. Thus, for example, the line 84 at the top surface intersects with separation layers 104 and 104a. In like manner the line 94 in the bottom surface intersects with the separation layers 107 and 107a. The inner layers of separation 122, and 123 and 124 are adapted to be subjected to internal fluid inflation pressure so as to form the passageways 72, 73 and 74 respectively by distension.

It will be appreciated that a structure of the type shown in FIG. 13 is susceptible to various modifications and changes so as to adapt it for various structural purposes. For example, the fins on one side can be of the type shown in FIG. 13 to provide not only improved heat transmission but also an ornamental facing. The fins on the other side of such a panel may be fewer in number but greater in extension in accordance with the disclosure of FIGS. 8 and 9 to provide flanges at which connection can be readily made for the purpose of supporting the panel. The supporting flanges can be perforated or made sufficiently thin so as to be readily perforated for the purpose of hanging the panel from a beam or supporting it against a building upright in the construction of ceilings and wall surfaces, respectively. If desired one of the surfaces may be free from fins or flanges and may be relatively flat. Thus any combination of fins, supporting flanges and internal passageways is contemplated.

In any event the article of FIG. 13 shows how more stiffening or heat exchange effect can be obtained in relatively wide solid sections of the panel between relatively widely spaced distended passageway portions by means of additional outer component layers which are peeled partially and bent to form a greater number of fins in combination with the passageway corrugations.

In the manufacture of this embodiment, the blank 100 shown in FIG. 14 is fed and drawn through a bending die 200 from which there emerges as an intermediate product the finned uninflated sheet 110 which after inflation forms the panel 71 as shown in FIG. 13.

According to the blank and process shown in FIG. 14 an incision occurs before the outward bending of the fins rather than substantially simultaneously with the bending of the fins. This blank, instead of being made up of component layers each coextensive with the finished panel and to be later subdivided by slitting, consists essentially of a plurality of outer contiguous strips side-by-side each, however, initially separated from the adjoining strips at their lateral edges. While two layer outer strips are shown, any suitable number of layers in each outer separate strip may be employed such as one or more, to give one or more corresponding sets of protruding fins or ribs, respectively. In this embodiment, it is preferred that the separation layers and lines of subdivision all extend longitudinally in the direction of rolling by which the component layers are pressure unified.

Figure 15:
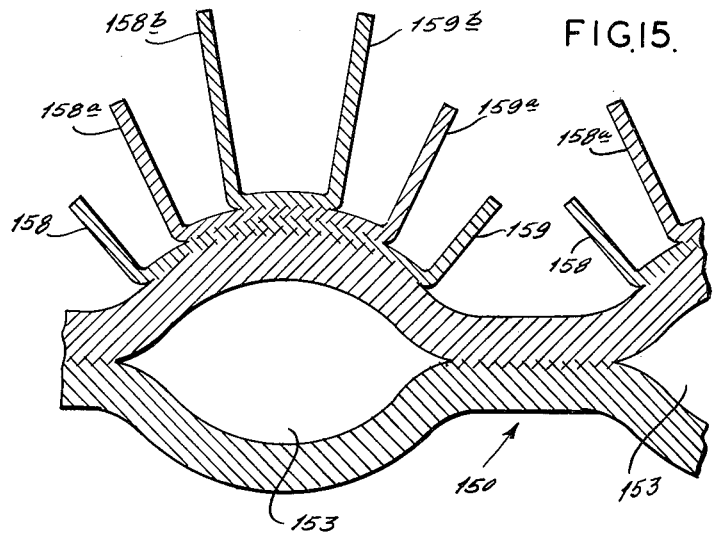
FIG. 15 is a cross sectional view of still another embodiment.
Figure 16:
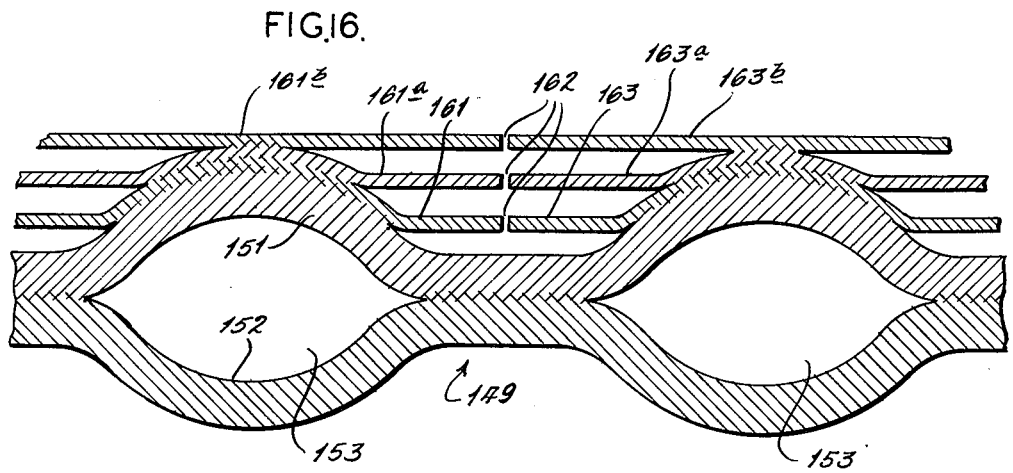
FIG. 16 is a cross sectional view taken at a stage in the manufacture of this embodiment.

FIGS. 15 and 16 show the formation of an article similar to that of FIG. 13 with the difference, however, that the article of FIG. 15 is provided with a multiplicity of fins on the walls of the passageway portion instead of on the solid web portion of the panel. As shown in the drawing the panel 150 is cavitated at 153 and has an integral set of fins on a distended wall of the cavitated portion 153 all running parallel to the cavity. The cluster of six thin fins are all pressure unified to the top of the distended wall and extended directly outwardly therefrom. The fin cluster consists of the primary pair of fins 158 and 159, the secondary pair 158a and 159a, and the tertiary pair 158b and 159b. These multiple lateral fins are especially desirable where increased heat transfer is needed. It will be understood that where the tube passageways are more widely spaced another fin cluster can also be integrated with the solid portion of panel 150 between the passageways.

As shown in FIG. 16 a pack structure is formed comprising two basic starting members 151 and 152 and three outer component strips such as 161, 161a and 161b and other contiguous outer component strips such as 163, 163a and 163b separated from the first group of outer component layers at the disjuncture 162. As in the blank of FIG. 14, these various layers are pressure unified in certain portions so as to form a structure, all layers of which are integrated except at certain internal areas or strata at which the blank is laminated and adapted to be separated to form internal passageways and outwardly extending fin portions spaced from each other. In the stage of manufacture shown in FIG. 16 the blank 149 has been subjected to internal pressure to generate the tube passageways 153. This also separates and partially peels the edge portions of the outer component layers adjacent the disjuncture preparatory to bending these edge portions upwardly and outwardly to form the fin clusters.

The article of FIG. 15 includes features of the invention shown in the article of FIGS. 1-4 as well as the article of FIG. 13. It is characterized by fins or ribs rooted to the distended walls of the cavitated portion of the panel and is also characterized by compound fins formed from two or more outer component layers.

It is to be noted that to facilitate provision of ribs of fins of desired proportion, the outer component sheets for any embodiment are advantageously thinner than the inner component or starting layers. But especially with compounded fins, each in sets of four or more as shown in FIGS. 14 and 15, the outer component sheets or strips from which the fins are to be formed should be considerably thinner than the inner component sheets which form the foundation or basic portion of the panel.

In no event, however, are the fins formed by bending any portion of the relatively heavy basic layer or layers of the panel which was found to cause a severe loss in rigidity and with less improvement in heat exchange than that obtainable in accordance with this invention.

Although rectilinearly extending fins have been shown and described in connection with various specific embodiments, curvilinearly and continuously extending fins may be employed. But regardless of the way the fins extend along the panel, all ribs must protrude outwardly at a relatively sharp right angle with the surface along which the ribs extend, as shown in the drawings of various embodiments and particularly FIGS. 8 and 10. This sharp right angular protrusion is important for realization of the various hereinbefore noted advantages and notably that of stiffening. If the bend is not sharp or is at a lesser angle or amounts to a mere rounded turning in, the panel will be found to be weakened as a result of thinning instead of being reinforced as a result of the presence of the rib or fin members.

While a number of specific embodiments now believed to be preferred have been described in the foregoing, it will be understood that the invention is not limited thereto and that further changes and modifications may be made by those skilled in the art without departing from the spirit and scope of this invention as set forth in the appended claims.

Having thus described the invention, we claim:

1. In the method of manufacture of an externally finned hollow plate, the steps comprising superposing a pair of intermediate elongated sheets of metal having between them a layer of weld preventing material applied in a first pattern forming at least one longitudinally extending stripe spaced from the lateral edges of said sheets, sandwiching said intermediate sheets and included first layer of weld preventing material between a pair of surface sheets of metal with an intervening second layer of said weld preventing material applied between the outer face of each of said intermediate sheets and the adjacent surface sheet in a second pattern having spaced parallel bands superposed with respect to said first pattern and extending between opposite peripheral edges of said sheets, hot rolling the entire assembly while preventing interfacial slippage between said sheets of metal of the assembly so as to pressure weld all the component sheets together except in the interfacial areas occupied by said weld preventing material to form a tube sheet, subdividing the surface sheets along spaced lines extending between said opposite edges of said tube sheets to form laterally opposed pairs of edges of subdivision, each pair disposed opposite a band of said second patterns and therefore unwelded to the adjacent intermediate sheet, bending said edges outwardly to form a series of transverse fins, and thereafter admitting high pressure inflation fluid along said first pattern so as to separate said intermediate sheets along said weld preventing material sufficiently to distend the intermediate sheets of the assembly outwardly along said first pattern of weld preventing material thereby providing longitudinal extending fluid passageways in association with said fins.

2. In the method of manufacture of an externally finned hollow plate the steps comprising superposing a pair of intermediate component sheets of metal having between them a layer of weld preventing material in a first pattern characterized by a laterally extending band and longitudinally extending stripe arrangement surrounding isolated open areas at which contact of said intermediate steets is permitted, applying an outside sheet on the outer face of at least one of said intermediate sheets separated therefrom in laterally extending longitudinally spaced areas overlying said isolated areas by a second pattern of weld preventing material consisting of laterally extending bands the ends of which extend beyond the lateral edges of said first pattern in interconnected relationships, said laterally extending bands being separated by laterally extending areas at which said applied sheet may contact the adjacent intermediate sheet, pressure welding adjacent sheets together in all said areas of contact, subjecting said assembly to a metal working operation for cutting apart said applied sheet along a laterally extending line in the area of each of the laterally extending bands of said second pattern and deforming said sheet adjacent said cut outwardly to thereby form laterally extending external fins integral with the hollow body, and thereafter admitting high pressure inflation fluid along said first pattern of weld preventing material so as to separate said intermediate component sheets from each other in the interfacial areas occupied by said material, thereby forming internal fluid passageways.

3. The method of claim 2 wherein the metal working step is accomplished by driving in metal cutting and deforming means in alternation from the opposite lateral edges.

4. In the method of manufacture of an externally finned hollow sheet article the steps comprising putting together a pair of primary sheets maintained in distinct separation at a first pattern consisting of stripes of weld preventing material in laterally extending band and longitudinally extending stripe arrangement with spaced open areas at which contact of said intermediate sheets is permitted, applying a secondary sheet on each of outer faces of said primary sheets maintained distinctly separate therefrom in a second pattern of laterally extending bands of weld preventing material the ends of which extend beyond the lateral edges of said first pattern, said laterally extending bands being spaced by laterally extending areas at which said secondary sheet contacts the adjacent primary sheet, pressure welding adjacent ones of said component sheets together in said areas of contact, admitting fluid inflation pressure along said second pattern so as to increase the separation between said applied sheet and the adjacent intermediate sheet along said laterally extending bands of said second pattern, shearing off the welded assembly along the lateral edges so as to expose the ends of said bands of the second pattern, cutting apart said secondary sheet along a laterally extending line in the area of each of said bands of the second pattern and deforming the cut apart laterally extending edges of said secondary sheet outwardly to form external fins and then applying high pressure inflation fluid along said first pattern of weld preventing material so as to erect longitudinally extending heat exchanger passageways between said primary sheets.

5. The method of making a finned tubular sheet structure comprising a combination of the steps of interposing weld inhibiting material to define a tube pattern between adjacent surfaces of superposed inner component sheets, superimposing at least one outer component sheet for forming fin portions on at least one of the outermost faces of said inner sheets with weld inhibiting material interposed in a fin pattern between adjacent surfaces externally of said inner sheets, forming a tube sheet by welding all adjacent surfaces of said sheets together in their areas not separated by weld inhibiting material, severing the outer component sheet in the unwelded portion of the fin pattern, and injecting into the unwelded portions between said inner sheets sufficient fluid pressure to distend said tube sheet, said method including deforming the severed unwelded portions of said outer component sheet to extend externally out of said tubular structure.

6. The method of making a finned tubular sheet structure comprising a combination of the steps of interposing weld-inhibiting material to define a tube pattern and a separate fin pattern between adjacent surfaces of superimposed component sheets, said fin pattern being separated from said tube pattern by contiguous portions of said sheets, forming a tube sheet by welding all adjacent surfaces of said sheets together in their areas not separated by weld inhibiting material, severing said component sheets in the unwelded portions of the fin pattern into fin portions without severing said sheets in the unwelded portions of said tube pattern, and injecting into the unwelded portions between said inner sheets defined by said tube pattern sufficient fluid pressure to distend said tube sheet, said method including deforming said fin portions to extend externally from said tubular structure.

7. The method of making a finned tubular sheet structure comprising a combination of the steps of interposing weld inhibiting material to define a tube pattern between adjacent surfaces of superposed inner component sheets, superimposing at least one outer component sheet for forming fin portions on at least one of the outermost faces of said inner sheets with weld inhibiting material interposed in a fin pattern between adjacent surfaces externally of said inner sheets, forming a tube sheet by welding all adjacent surfaces of said sheets together in their areas not separated by weld inhibiting material, severing the outer component sheet in the unwelded portion of the fin pattern, deforming said unwelded portions to extend externally out of said tubular structure and injecting into the unwelded portions between said inner sheets sufficient fluid pressure to distend said tube sheet.

References Cited by the Examiner

UNITED STATES PATENTS

| | | | |
|---|---|---|---|
| 2,182,338 | 12/39 | Gurlik | 257—139 |
| 2,195,259 | 3/40 | Ramsaur | 257—139 |
| 2,261,137 | 11/41 | Brown | 29—157.3 |
| 2,375,334 | 5/45 | Valyi et al. | 29—157.3 |
| 2,690,002 | 9/54 | Grenell | 29—157.3 |
| 2,759,247 | 8/56 | Grenell et al. | 29—157.3 |
| 2,766,514 | 10/56 | Adams | 29—157.3 |

WHITMORE A. WILTZ, *Primary Examiner.*

HERMAN BERMAN, *Examiner.*